(12) United States Patent
Aizawa et al.

(10) Patent No.: US 7,234,764 B2
(45) Date of Patent: Jun. 26, 2007

(54) MOUNTING STRUCTURE FOR SENSOR COVERED WITH STEP GARNISH

(75) Inventors: Teruaki Aizawa, Utsunomiya (JP); Kazuaki Miyamoto, Utsunomiya (JP); Masayuki Shiga, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/189,457

(22) Filed: Jul. 26, 2005

(65) Prior Publication Data
US 2006/0028056 A1    Feb. 9, 2006

(30) Foreign Application Priority Data
Aug. 4, 2004   (JP)   ............... 2004-228213

(51) Int. Cl.
*B60R 13/02*   (2006.01)
*B60R 21/0132*   (2006.01)
(52) U.S. Cl. ............... 296/209; 296/1.08; 296/187.08; 296/187.12; 296/193.07; 180/274
(58) Field of Classification Search ............... 296/209, 296/1.08, 39.1, 193.07, 187.08, 187.12, 97.23; 280/735; 180/274, 282
See application file for complete search history.

(56) References Cited

U.S. PATENT DOCUMENTS

| | | | | |
|---|---|---|---|---|
| 6,241,280 B1 * | 6/2001 | Biewendt et al. | ........... | 280/735 |
| 6,583,367 B2 * | 6/2003 | Wolfe et al. | ................. | 177/136 |
| 6,644,723 B2 * | 11/2003 | Motozawa | ............. | 296/187.12 |
| 6,948,753 B2 * | 9/2005 | Yoshida et al. | ............ | 296/1.08 |
| 6,979,054 B2 * | 12/2005 | Yamamoto et al. | ......... | 296/209 |
| 7,040,682 B2 * | 5/2006 | Tokumoto et al. | ......... | 296/1.08 |

FOREIGN PATENT DOCUMENTS

| JP | 10-029500 | 2/1998 |
|---|---|---|
| JP | 2001-080451 | 3/2001 |

* cited by examiner

*Primary Examiner*—D. Glenn Dayoan
*Assistant Examiner*—Greg Blankenship
(74) *Attorney, Agent, or Firm*—Rankin, Hill, Porter & Clark LLP

(57) ABSTRACT

In a sensor mounting structure, a sensor is mounted in an outer portion of the floor panel in a width of the vehicle, and a step garnish, extending in a length of the vehicle, is attached above the outer portion so as to cover the sensor. The step garnish may have a rib extending in the length of the vehicle; and the sensor may be positioned inside the rib in the width of the vehicle. Preferably, the step garnish has a plurality of ribs extending in the length of the vehicle; each rib has clip portions for attaching the step garnish to the floor panel; and the sensor is positioned between two of the ribs. Typically, the rib protrudes downward from a lower face of the step garnish. The floor panel may have a concave portion; and the sensor may be attached to a bottom of the concave portion.

12 Claims, 2 Drawing Sheets

MOUNTING STRUCTURE FOR SENSOR COVERED WITH STEP GARNISH

BACKGROUND OF THE INVENTION

1. Field of the Invention

The present invention relates to a structure for mounting a sensor provided for detecting a side-on collision of a vehicle.

Priority is claimed on Japanese Patent Application No. 2004-228213, filed Aug. 4, 2004, the content of which is incorporated herein by reference.

2. Description of Related Art

When a sensor for detecting a collision of a vehicle (e.g., an acceleration sensor) is mounted on a vehicle's body, it is necessary to exclude the influence of deformation in the vicinity of the portion to which the sensor is attached, as much as possible, so as to secure required sensing performance. Therefore, generally, such a sensor is attached to a portion having high rigidity in the vehicle body. For example, in order to mount a sensor for detecting a side-on collision of a vehicle, there are known structures such as (i) a structure for attaching a sensor to a side sill which forms a closed-section structure at an outer portion of the vehicle body in the width (direction) of the vehicle (see, for example, Japanese Unexamined Patent Application, First Publication No. H10-029500), and (ii) a structure for attaching a sensor to a rear wheel arch section which also forms a closed-section structure at an outer portion of the vehicle body in the width of the vehicle (see, for example, Japanese Unexamined Patent Application, First Publication No. 2001-080451).

Therefore, when mounting a sensor for detecting a side-on collision of a vehicle, the sensor may be attached to a side sill or a rear wheel arch section. However, there are vehicles having a structure in which a side sill is provided at the exterior of the vehicle, and the position of the side sill is lower than that of the floor panel so as to create a flush structure between the lower edge of a door opening and the floor of the vehicle. In this case, when a sensor is mounted to the side sill, the sensor is attached to the exterior of the vehicle. This is not preferable.

SUMMARY OF THE INVENTION

In light of the above circumstances, an object of the present invention is to provide a structure for mounting a sensor for detecting a side-on collision of a vehicle, so as to appropriately mount the sensor while securing required performance, even when this mounting structure is applied to a vehicle which has a side sill positioned lower than the floor panel.

Therefore, the present invention provides a sensor mounting structure for a vehicle having a floor panel (e.g., a floor panel 23 in an embodiment explained later), wherein:

a sensor (e.g., a sensor 21 in the embodiment) is mounted in an outer portion of the floor panel in a width of the vehicle; and a step garnish (e.g., a step garnish 71 in the embodiment), extending in a length of the vehicle, is attached above the outer portion so as to cover the sensor.

According to the present invention, the sensor is attached in an outer portion of the floor panel in the width of the vehicle, and the step garnish having high rigidity is attached above the outer portion so as to cover the sensor. Therefore, the sensor can be mounted at a portion surrounded by the floor panel and the step garnish, where this portion has high rigidity and is positioned at the interior side of the vehicle. Therefore, even when this structure is applied to a vehicle having a body structure in which the side sill is positioned lower than the floor panel, the sensor can be appropriately and preferably mounted while securing required sensing performance. In addition, even when the sensor is attached to the upper side of the floor panel, the sensor is covered with the step garnish, so that the sensing performance is not influenced by stepping of a passenger, or the like.

In a typical example, the step garnish has a rib (e.g., a rib 76 in the embodiment) extending in the length of the vehicle, and the sensor is positioned inside the rib in the width of the vehicle. Accordingly, the sensor is positioned at the inside of a rib of the step garnish, which extends in the length of the vehicle. Therefore, even when a side-on collision occurs at a striking position away from the sensor in the length of the vehicle, if the striking position is within the length of the step garnish, the step garnish suffers from the side-on collision and moves. Accordingly, the above rib at the outside hits the sensor so that the sensor can detect the side-on collision, thereby improving the sensing performance of the sensor.

In this case, preferably, the step garnish has a plurality of ribs extending in the length of the vehicle, each rib has clip portions (e.g., clip portions 80 in the embodiment) for attaching the step garnish to the floor panel, and the sensor is positioned between two of the ribs.

Accordingly, the clip portions for attaching the step garnish to the floor panel are provided in each rib. Therefore, after the step garnish is attached to the floor panel by using the clip portions, the sensor is arranged in a closed-section structure consisting of the ribs as side walls, the step garnish, and the floor panel. Therefore, it is possible to further improve the rigidity of the portion where the sensor is mounted.

Typically, the rib protrudes downward from a lower face of the step garnish.

In another typical example, the floor panel has a concave portion (e.g., a concave portion 68 in the embodiment), and the sensor is attached to a bottom of the concave portion.

Accordingly, even when the sensor is attached to the floor panel, the profile (i.e., the height) of the sensor which protrudes toward the interior of the vehicle can be reduced. Furthermore, the concave portion is also effective for further improving the rigidity of the portion where the sensor is mounted, thereby further improving the sensing performance of the sensor.

DETAILED DESCRIPTION OF THE INVENTION

Hereinafter, an embodiment according to the present invention will be described with reference to the Figures. In the following description, the length (direction) means the vehicle's front-rear direction.

Figure 1:
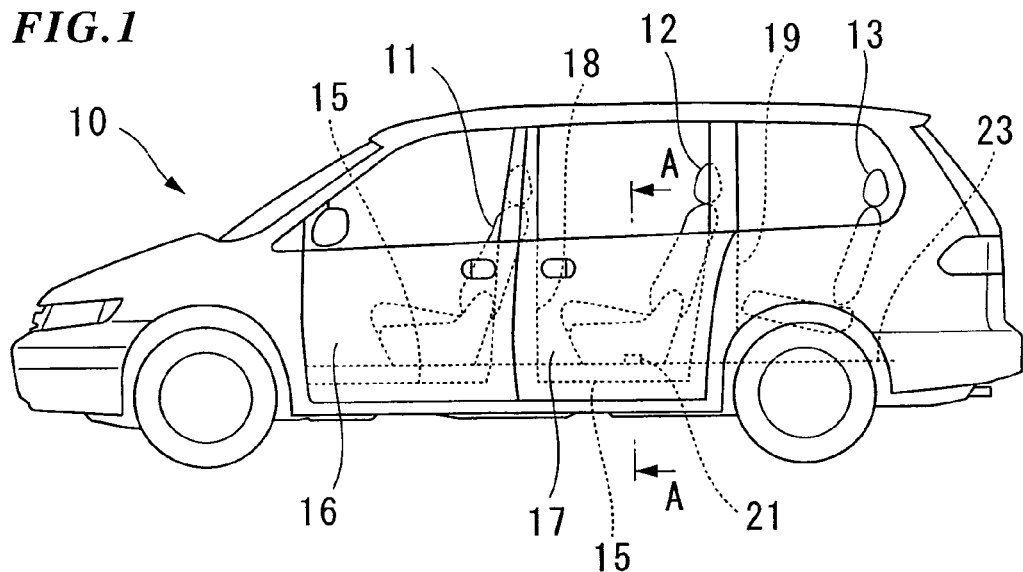
FIG. 1 is a general side view of a vehicle to which the sensor mounting structure as an embodiment of the present invention is applied.

FIG. 1 is a side view of a vehicle 10 to which the sensor mounting structure of the present invention is applied. The vehicle 10 has a three-row seat structure consisting of the first-row seat 11, the second-row seat 12, and the third-row seat 13, which are arranged in the length.

Each side of the vehicle 10 in the width of the vehicle has a lower portion in which a side sill 15, a constituent (i.e., a frame member) of the vehicle's main frame, is arranged and oriented in the length. The sensor mounting structure in the present embodiment is applied to a sensor 21 which is arranged in the vicinity of the side sill 15, more specifically, between (i) a pillar 18 as a frame member arranged vertically between a front door 16 and a rear door 17, and (ii) a pillar 19 as a frame member arranged vertically behind the rear door 17. This sensor 21 is an acceleration sensor for detecting a side-on collision occurring in the vicinity of the second-row seat 12 and activating an air bag (not shown) for an occupant in this seat 12.

Figure 2:
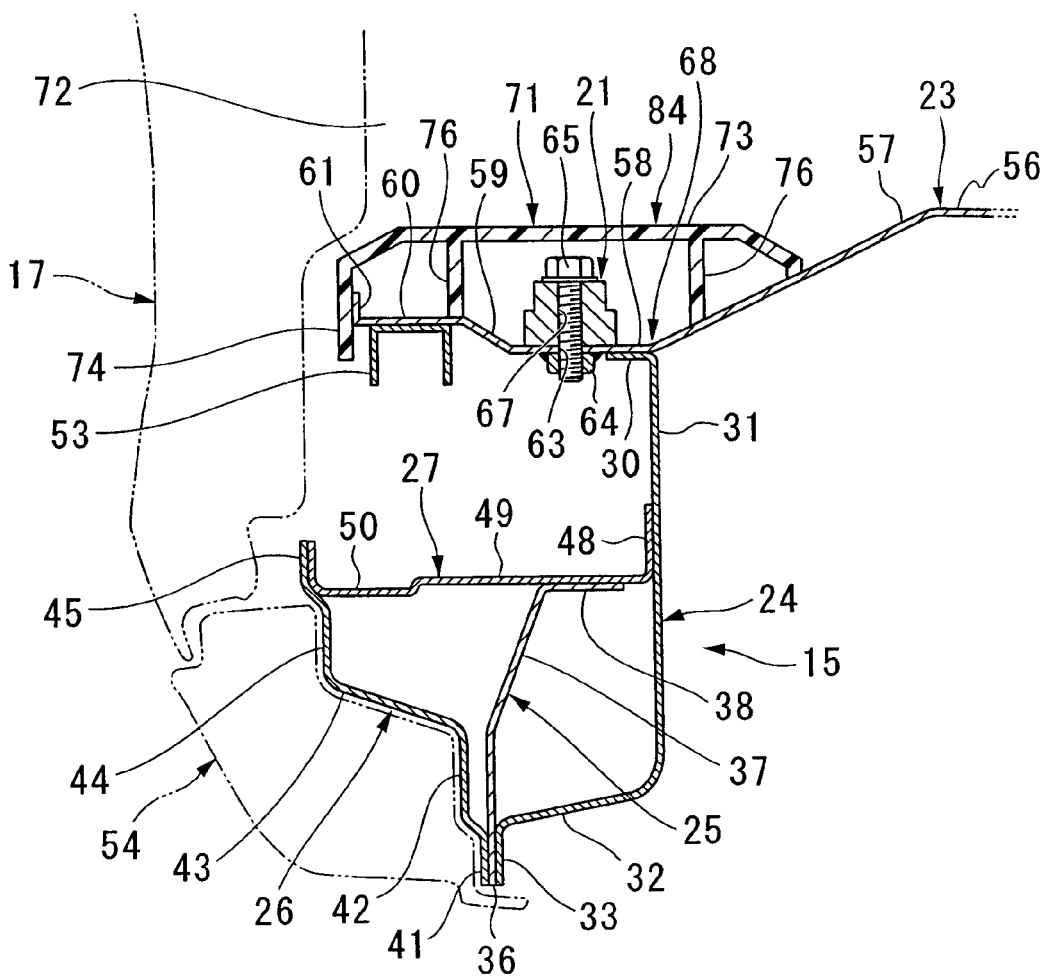
FIG. 2 is a sectional view along line A—A in FIG. 1.

FIG. 2 is a sectional view along line A—A in FIG. 1. In FIG. 2, reference numeral 23 indicates a floor panel which is made of a steel plate and is substantially horizontally arranged, and reference numeral 24 indicates a side sill inner portion which is made of a steel plate and is joined to an outer portion (in the width of the vehicle) of the lower face of the floor panel 23. To a lower portion of the side sill inner portion 24, a side sill stiffener 25, a side sill outer portion 26, and a side sill upper portion 27, each made of a steel plate, are joined. The side sill is constituted of the above elements 24 to 27.

The side sill inner portion 24 has (i) an upper flange portion 30 joined to the floor panel 23, (ii) a vertical plate portion 31 extending downward from the inner end (in the width of the vehicle) of the upper flange portion 30, (iii) a lower plate portion 32 extending from the lower end of the vertical plate portion 31 toward the outside in the width of the vehicle, and (iv) a lower flange portion 33 extending downward from the outer end (in the width of the vehicle) of the lower plate portion 32.

The side sill stiffener 25 has (i) a lower flange portion 36 joined to the outer face (in the width of the vehicle) of the lower flange portion 33 of the side sill inner portion 24, (ii) a slope plate portion 37 extending from the upper end of the lower flange portion 36 in an inclined direction in a manner such that the higher, the more inner in the width of the vehicle, and (iii) an upper flange portion 38 extending from the upper end of the slope plate portion 37 to the inside in the width of the vehicle.

The side sill outer portion 26 has (i) a lower flange portion 41 joined to the outer face (in the width of the vehicle) of the lower flange portion 36 of the side sill stiffener 25, (ii) a lower plate portion 42 extending from the upper end of the lower flange portion 41 slightly toward the outside in the width of the vehicle and then extending upward, (iii) a slope plate portion 43 extending from the upper end of the lower plate portion 42 in an inclined direction in a manner such that the higher, the further out in the width of the vehicle, (iv) an upper plate portion 44 extending upward from the upper end of the slope plate portion 43, and (v) an upper flange portion 45 extending from the upper end of the upper plate portion 44 slightly toward the outside in the width of the vehicle and then extending upward.

The side sill upper portion 27 has (i) a flange portion 48 joined to the outer face (in the width of the vehicle) of the vertical plate portion 31 of the side sill inner portion 24, (ii) an intermediate plate portion 49 extending from the lower end of the flange portion 48 toward the outside in the width of the vehicle, and (iii) a flange portion 50 which extends upward from the outer end (in the width of the vehicle) of the intermediate plate portion 49 and is joined to the inner face (in the width of the vehicle) of the upper flange portion 45 of the side sill outer portion 26. In addition, to the lower face of the above intermediate plate portion 49, the upper flange portion 38 of the side sill stiffener 25 is joined.

Specifically, the side sill 15, which is a frame member of the vehicle and has a closed-section shape, is constituted of the lower portion of the side sill inner portion 24, the side sill stiffener 25, the side sill outer portion 26, and the side sill upper portion 27. The side sill 15 is positioned lower than the floor panel 23, thereby creating a flush floor structure in which the side sill 15 is not positioned higher than the floor panel 23.

In FIG. 2, reference numeral 53 indicates a slide rail attached to the lower face of the floor panel 23. The slide rail 53 is positioned further outward than the side sill inner portion 24 in the width of the vehicle, and is coupled with an arm (not shown) of the rear door 17 which is a sliding door. Between the side sill upper portion 27 and the floor panel 23, an opening toward the outside in the width of the vehicle is provided so as to couple the arm of the rear door 17 with the slide rail 53.

In addition, a side sill garnish 54 made of synthetic resin is attached to the outer face (in the width of the vehicle) of the side sill outer portion 26.

An outer portion (in the width of the vehicle) of the floor panel 23 has (i) a slope plate portion 57 extending from the outer end (in the width of the vehicle) of a horizontal floor plate 56 in an inclined direction in a manner such that the further toward the outside in the width of the vehicle, the lower, (ii) a horizontal plate portion 58 which extends from the outer end (in the width of the vehicle) of the slope plate portion 57 and is horizontally arranged toward the outside in the width, (iii) a slope plate portion 59 extending from the outer end (in the width of the vehicle) of the horizontal plate portion 58 in an inclined direction in a manner such that the further toward the outside in the width of the vehicle, the higher, (iv) a horizontal plate portion 60 which extends from the outer end (in the width of the vehicle) of the slope plate portion 59 and is horizontally arranged toward the outside in the width, and (v) a side plate portion 61 extending upward from the outer end (in the width of the vehicle) of the horizontal plate portion 60.

The above-described slide rail 53 is attached to the horizontal plate portion 60, and the above-described flange portion 30 of the side sill inner portion 24 is attached to the lower face of the horizontal plate portion 58, where the horizontal plate portion 60 is positioned further toward the outside in the width of the vehicle than the horizontal plate portion 58, and the portion to which the flange portion 30 is attached is adjacent to the slope plate portion 57.

In the horizontal plate portion 58, an attachment hole 63 is formed at a position further toward the outside than the position of the flange portion 30 of the side sill inner portion 24 in the width of the vehicle. A weld nut 64 is fastened to the lower face of the horizontal plate portion 58 while matching the position of the nut 64 to the position of the attachment hole 63. The sensor 21 is attached to the horizontal plate portion 58 by using an attachment bolt 65 which is inserted into the attachment hole 63. More specifically, the sensor 21 has an attachment hole 67 formed vertically. After the sensor 21 is disposed on the horizontal plate portion 58, the attachment bolt 65 is inserted into the attachment hole 67 from the upper side of the sensor 21, and further inserted into the attachment hole 63 of the horizontal plate portion 58, and then screwed into and engaged with the weld nut 64 below the attachment hole 63, so that the sensor 21 is fixed to the horizontal plate portion 58. In addition, the horizontal plate portion 58 and the slope plate portions 57 and 59 at either side of the horizontal plate portion 58 form a concave portion 68 which is concave downward and extends in the length of the vehicle, and the sensor 21 is attached to the horizontal plate portion 58 as the bottom of the concave portion 68.

The sensor 21 is mounted at an outer portion of the floor panel 23 in the width of the vehicle, as explained above. Above this outer portion of the floor panel 23, a step garnish 71 made of synthetic resin is provided, which has substantially the same height as that of the floor plate 56 and extends in the length of the vehicle. Accordingly, the sensor 21 is covered with the step garnish 71 from the upper side.

When a passenger gets into or out of the vehicle via a rear door opening 72 which can be closed by the rear door 71, the passenger generally steps on the step garnish 71. Therefore, the step garnish 71 has an upper plate portion 73 on which the passenger actually steps, and a peripheral plate portion 74 protruding downward from the edge of the upper plate portion 73.

Figure 3:
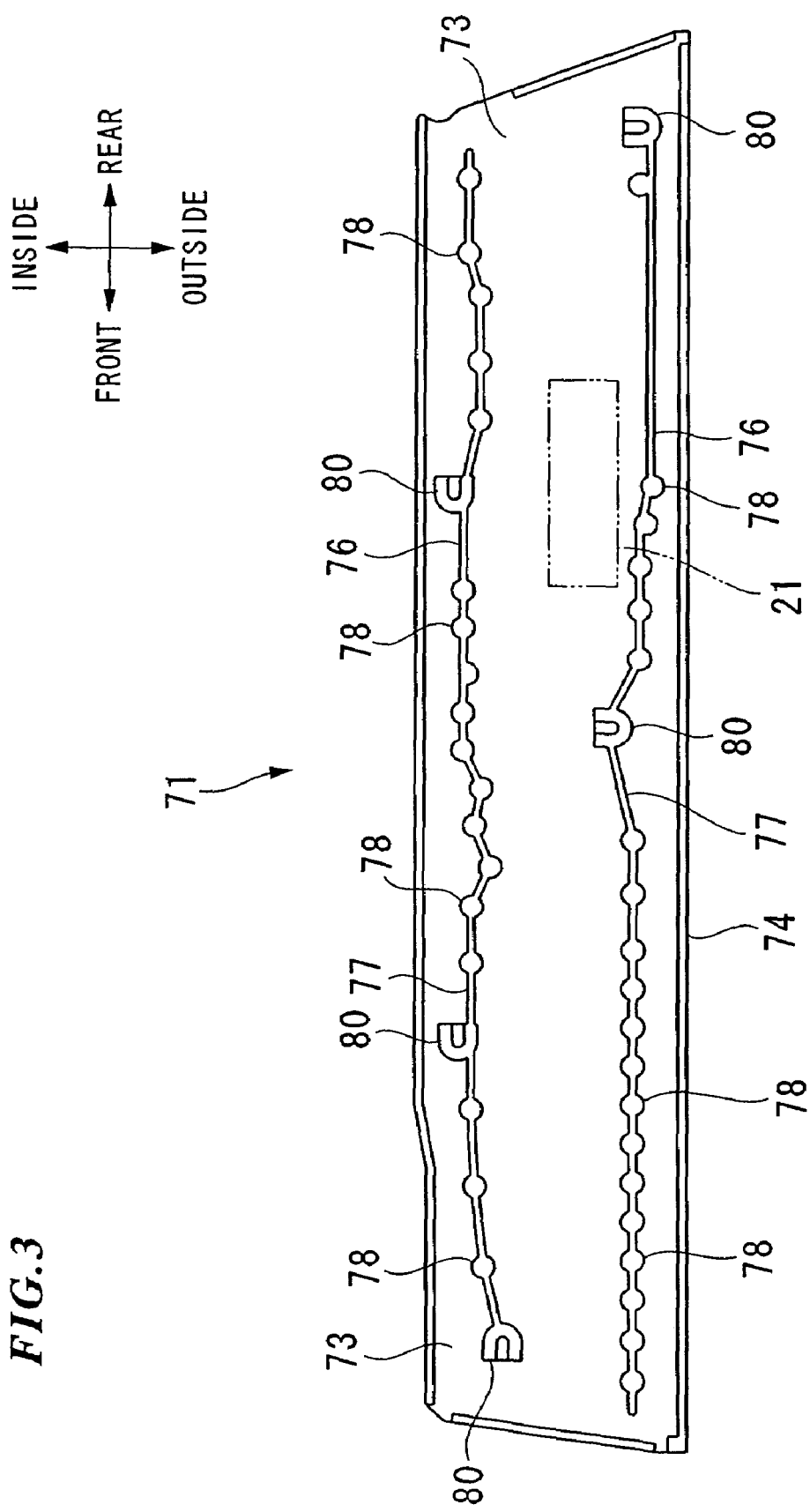
FIG. 3 is a bottom view of the step garnish in the sensor mounting structure of the embodiment.

The step garnish 71 also has a plurality of ribs 76 (specifically, two ribs 76) which protrude downward from the upper plate portion 73 and are arranged inside from the peripheral plate portion 74 at intervals in the width of the vehicle. FIG. 3 is a bottom view of the step garnish 71. As shown in FIG. 3, each rib 76 has a plate portion 77 extending in the length of the vehicle, and a number of pillars 78 for reinforcing appropriate positions of the plate portion 77. The diameter of each pillar 78 is larger than the thickness of the plate portion 77.

A plurality of clip portions 80 are formed at specific positions in each rib 76 so as to attach the step garnish 71 to the floor panel 23. More specifically, a plurality of the clip portions 80 (two clip portions 80 in this embodiment) formed in the rib 76 at the outside in the width of the vehicle may be engaged with attachment holes (not shown) formed in the horizontal plate portion 60 of the floor panel 23, and a plurality of the clip portions 80 (three clip portions 80 in this embodiment) formed in the rib 76 at the inside in the width of the vehicle may be engaged with attachment holes (not shown) formed in the slope plate portion 57 of the floor panel 23. According to such clip portions 80 engaged with the floor panel 23, the step garnish 71 is attached to the floor panel 23.

Therefore, after the step garnish 71 is attached to the floor panel 23, almost the whole length of each rib 76 contacts the floor panel 23, and the sensor 21 is positioned between both ribs 76 of the step garnish 71. That is, the sensor 21 is positioned further inward than the rib 76 at the outside in the width of the vehicle. Here, each rib 76 is longer than the sensor 21 in the length of the vehicle, and thus the sensor 21 is arranged within the length of the rib 76 in the length of the vehicle.

The step garnish 71 also has other reinforcement ribs and pillars protruding downward from the upper plate portion 73, which are not shown in the Figures for convenience of explanation.

According to the above-described embodiment, the sensor 21 is attached in an outer portion of the floor panel 23 in the width of the vehicle, and the step garnish 71 having high rigidity is attached above the outer portion so as to cover the sensor 21. Therefore, the sensor 21 can be mounted at a portion surrounded by the floor panel 23 and the step garnish 71, where this portion has high rigidity and is positioned at the interior side of the vehicle. Therefore, even when this structure is applied to a vehicle having a body structure in which the side sill 15 is positioned lower than the floor panel 23, the sensor 21 can be appropriately and preferably mounted while securing required sensing performance. In addition, even when the sensor 21 is attached to the upper side of the floor panel 23, the sensor 21 is covered with the step garnish 71, so that the sensing performance is not influenced by stepping of a passenger, or the like.

In addition, the sensor 21 is positioned at the inside of a rib 76 of the step garnish 21, which extends in the length of the vehicle. Therefore, even when a side-on collision occurs at a striking position away from the sensor 21 in the length of the vehicle, if the striking position is within the length of the step garnish 71, the step garnish 71 suffers from the side-on collision and moves or falls off. Accordingly, the above rib 76 at the outside hits the sensor 21 so that the sensor 21 can detect the side-on collision, thereby improving the sensing performance of the sensor 21.

Furthermore, the clip portions 80 for attaching the step garnish 71 to the floor panel 23 are provided in each rib 76. Therefore, after the step garnish 71 is attached to the floor panel 23 by using the clip portions 80, the sensor 21 is arranged in a closed-section structure 84 (see FIG. 2) consisting of the ribs 76 as side walls, the step garnish 71, and the floor panel 23. Therefore, it is possible to further improve the rigidity of the portion where the sensor 21 is mounted.

In addition, the concave portion 68 is formed in the floor panel 23, and the sensor 21 is mounted in the concave portion 68. Therefore, even when the sensor 21 is attached to the floor panel 23, the profile (i.e., the height) of the sensor 21 which protrudes toward the interior of the vehicle can be reduced. Furthermore, the concave portion 68 is also effective for further improving the rigidity of the portion where the sensor 21 is mounted, thereby further improving the sensing performance of the sensor 21.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A collision sensor mounting structure for a vehicle having a floor panel, wherein:
    a collision sensor is mounted to a laterally outer portion of the floor panel, said collision sensor being adapted to sense a side-on collision of the vehicle; and
    a step garnish, extending in a length direction of the vehicle, is attached above the floor panel outer portion so as to cover the sensor, whereby said collision sensor is received within a space defined between said floor panel and said step garnish wherein:
    the step garnish has a rib extending in the length direction of the vehicle; and
    the sensor is positioned laterally inboard of the rib in a width direction of the vehicle.

2. The collision sensor mounting structure as claimed claim 1, wherein:
    the step garnish has a plurality of ribs extending in the length direction of the vehicle;
    each rib has clip portions for attaching the step garnish to the floor panel; and
    the sensor is positioned between two of the ribs.

3. The collision sensor mounting structure as claimed claim 1, wherein the rib protrudes downward from a lower face of the step garnish and rests upon the floor panel.

4. The collision sensor mounting structure as claimed in claim 1, wherein:
the floor panel outer portion defines a concave portion; and
the collision sensor is attached to a bottom of the concave portion.

5. The collision sensor mounting structure as claimed in claim 4, wherein said floor panel further includes a planar portion and wherein said step garnish is placed over said concave portion such that said step garnish covers said concave portion and such that an upper surface of said step garnish is substantially flush with said planar portion.

6. The collision sensor mounting structure as claimed in claim 5, wherein:
the step garnish has a plurality of ribs extending in the length direction of the vehicle;
each rib has clip portions for attaching the step garnish to the floor panel; and
the sensor is positioned between two of the ribs.

7. The collision sensor mounting structure as claimed in claim 4, wherein the rib protrudes downward from a lower face of the step garnish and rests upon the floor panel.

8. The collision sensor mounting structure as claimed in claim 1, wherein said floor panel outer portion is disposed relatively vertically above a side sill of the vehicle such that said collision sensor is disposed vertically above said side sill.

9. The collision sensor mounting structure as claimed in claim 8, wherein a slide rail is mounted to a bottom surface of the floor panel and relatively outboard of said collision sensor.

10. The collision sensor mounting structure as claimed in claim 9, wherein said floor panel further includes a planar portion and a concave portion, and wherein said step garnish is placed over said concave portion such that said step garnish covers said concave portion and such that an upper surface of said step garnish is substantially flush with said planar portion.

11. The collision sensor mounting structure as claimed in claim 10, wherein:
the step garnish has a plurality of ribs extending in the length direction of the vehicle;
each rib has clip portions for attaching the step garnish to the floor panel; and
the sensor is positioned between two of the ribs.

12. The collision sensor mounting structure as claimed in claim 10, wherein the rib protrudes downward from a lower face of the step garnish and rests upon the floor panel.

* * * * *